United States Patent Office 3,449,305
Patented June 10, 1969

3,449,305
INTERPOLYMERS OF VINYLIDENE FLUORIDE
Frederic B. Stilmar, Wilmington, Del., assignor to E. I. du Pont de Nemours and Company, Wilmington, Del.
No Drawing. Filed Mar. 1, 1966, Ser. No. 530,769
Int. Cl. C08f 15/40
U.S. Cl. 260—80.76                     21 Claims

ABSTRACT OF THE DISCLOSURE

An interpolymer comprising
(A) vinylidene fluoride,
(B) from about 0.1 to about 0.4 mole of tetrafluoroethylene per mole of vinylidene fluoride, and
(C) from about 0.05 to about 0.3 mole, per mole of vinylidene fluoride, of a vinyl ester of a $C_2$ to $C_{18}$ alkane carboxylic acid;
said interpolymer having an inherent viscosity of at least 0.30 as a 0.5% solution by weight in dimethylformamide at 30° C., and which can also contain from about 0.05 mole to about 0.4 mole, per mole of vinylidene fluoride, of at least one polymerizable mono-unsaturated monomer chosen from (a) $C_3$ fluorocarbon olefins, (b) $C_2$ to $C_3$ chlorofluorocarbon olefins, (c) $C_2$ to $C_8$ hydrocarbon monoolefins containing the group $CH_2=C<$, and (d) alkyl vinyl ether wherein the alkyl group is 1 to 16 carbon atoms.

---

This invention relates to vinylidene fluoride interpolymers.

Polymers of vinylidene fluoride with other fluoroine-containing compounds have been extensively described in the prior art. For example, U.S. Patent 2,468,054 discloses the copolymerization of vinylidene fluoride with tetrafluoroethylene or with a mixture of tetrafluoroethylene and another halogenated ethylene to produce tough thermally stable polymers which are useful in coatings and insulating materials. Many of the more recent patents relating to vinylidene fluoride copolymerization are concerned with the production of elastomeric polymers. Another recent patent, U.S. Patent 3,169,120, discloses interpolymers of vinylidene fluoride with up to 5 mole percent of a halogenated ethylene which are used in the form of dispersions to form coatings.

These polymers of vinylidene fluoride described in the prior art, although useful as coating compositions, are deficient in certain properties such as solubility which would give them wide utility in the coatings field. These prior art polymers, however, do not have the balance of properties necessary to form a superior coating. Among the important properties desirable in a film-forming polymer to be used in a coating composition or paint are the following:

(1) a high degree of solubility in an inexpensive solvent;
(2) the ability to coalesce from solutions in common solvents to continuous films at ambient or room temperature;
(3) compatibility and loadability with common pigments;
(4) good color stability in the presence of pigments; and
(5) ease of application and formulation by ordinary techniques used by the paint industry.

The vinylidene fluoride polymers of the prior art are deficient in at least one or more of these desirable properties.

The present invention provides novel interpolymers of vinylidene fluoride, which, in contrast to the prior art vinylidene fluoride polymers, possess outstanding durability properties when used as exterior protective coatings. These interpolymers are prepared from known monomeric materials which have been previously used in preparation of fluoroethylene polymers. However,, the particular combination of copolymerizable monomers of this invention and the proportions in which they are found in the polymer end product have not been heretofore known, and this combination in the specified proportion results in novel polymers with a combination of flexibility, solubility, and durability properties not found in prior art products.

More particularly, the present invention is directed to a normally solid interpolymer comprising (A) vinylidene fluoride,
(B) from about 0.1 to about 0.4 mole of tetrafluoroethylene per mole of vinylidene fluoride, and
(C) from about 0.05 to about 0.3 mole, per mole of vinylidene fluoride, of a vinyl ester of a $C_2$ to $C_{18}$ alkane carboxylic acid;

said interpolymer having an inherent viscosity of at least 0.30 as a 0.5% solution by weight in dimethylformamide at 30° C.

The present invention is also directed to interpolymers where, in addition to the three essential monomers described above, the interpolymer contains from about 0.05 mole to about 0.4 mole, per mole of vinylidene fluoride, of at least one polymerizable mono-unsaturated monomer chosen from (a) $C_3$ fluorocarbon olefins, (b) $C_2$ to $C_3$ chlorofluorocarbon olefins, (c) $C_2$ to $C_8$ hydrocarbon monoolefins containing the group $CH_2=C<$, and (d) alkyl vinyl ether wherein the alkyl group is 1 to 16 carbon atoms.

The novel polymers of this invention are prepared by copolymerizing at pressures of 100 to 10,000 p.s.i.g. and temperatures of about 50° C. to about 150° C. one mole of vinylidene fluoride, from about 0.1 to about 0.4 mole of tetrafluoroethylene, and from about 0.05 to about 0.3 mole of a copolymerizable vinyl ester of a $C_2$ to $C_{18}$ alkane monocarboxylic acid. The polymerization is carried out in the presence of a substantially inert polymerization medium and a free radical generating initiator. If desired, for purposes as described hereinafter, from about 0.05 to about 0.4 mole of certain selected polymerizable compounds per mole of vinylidene fluoride may also be included.

Formation of the highly tractable, high molecular weight interpolymers of the present invention comprising chain units derived from vinylidene fluoride, tetrafluoroethylene and a vinyl ester of an alkane monocarboxylic acid is indeed surprising since vinylidene fluoride and a vinyl ester copolymerize very poorly, yielding low molecular weight copolymers, in the absence of tetrafluoroethylene. Copolymerization of tetrafluoroethylene with the vinyl ester in the absence of vinylidene fluoride yields a copolymer which is poorly soluble and does not possess the desirable elongation properties of the interpolymers of the present invention. Vinylidene fluoride and tetrafluoroethylene readily copolymerize to form a copolymer which, however, does not coalesce at ordinary temperature to continuous films from solution in organic solvents, is not highly compatible with pigments, and does not have durable adhesion to substrates in contrast to the invention interpolymers. Thus, to achieve the novel combination of properties possessed by the polymers of the present invention, the polymers must contain units derived from each of the three comonomers within the ranges of concentration specified hereinbefore.

The polymer chains of the products of this invention must contain at least three different chain units. First, there is the chain unit $—CH_2—CF_2—$ dervied from vinylidene fluoride. It has been found upon analysis that the products of this invention have a vinylidene fluoride content of at least 50% to about 85% by weight.

The second chain unit, $-CF_2-CF_2-$, is derived from tetrafluoroethylene. The tetrafluoroethylene content of the end product is from about 5% to about 37% by weight.

The third chain unit is derived from the copolymerizable vinyl ester of a $C_2$ to $C_{18}$ alkane monocarboxylic acid. The vinyl ester content of the final product is from about 5% to about 40% by weight. The exact structure of the chain unit,

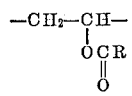

dervied from the copolymerizable vinyl ester will vary, of course, depending on the particular vinyl ester selected as the starting material. The grouping R is $C_1$ to $C_{17}$ alkyl. When less than 5% by weight vinyl ester is incorporated, the interpolymer has low elasticity, and coatings of such interpolymers on wood have poor durability to weather. Interpolymers which contain greater than 40% by weight of the vinyl ester component are very soft and tacky, thus being unsuitable for use as coatings, unsupported films, or fibers.

Among the useful copolymerizable vinyl esters of alkane monocarboxylic acids are vinyl esters of such straight chain acids as acetic, propionic, n-butyric, n-valeric, n-caproic, n-heptoic, pelargonic, lauric, and stearic acids. Vinyl esters of branched chain alkane monocarboxylic acids are also useful components in the polymers of the present invention. Such branched chain monocarboxylic acids include isobutyric, pivalic, isovaleric, 2-ethylhexanoic, 2,2-dimethyloctanoic, 2-methyl-2-propylpentanoic acid, 4-methyl-4-butylhexanoic acid and those acids known to the art as neoacids and Koch acids such as are described in U.S. Patent 3,186,974.

The preferred vinyl ester is vinylbutyrate.

For certain uses, particularly where very high polymer solubility is desired while retaining other desirable properties of the polymer compositions of this invention, it is permissible and preferable to interpolymerize with the vinylidene fluoride, tetrafluoroethylene, and vinyl ester from about 0.05 to about 0.4 mole per mole of vinylidene fluoride of selected polymerizable vinylidene monomers. These vinylidene monomers include (a) $C_3$ fluorocarbon olefins, (b) $C_2$ to $C_3$ chlorofluorocarbon olefins, (c) $C_2$ to $C_8$ hydrocarbon monoolefins containing the group $CH_2=C<$, and (d) alkyl vinyl ethers wherein the alkyl group contains 1 to 16 carbons.

Representative examples of the optional $C_3$ fluoroolefins are hexafluoropropylene, pentafluoropropylene, trifluoropropylene, tetrafluoropropylene. Hexafluoropropylene is preferred.

Representative examples of the optional $C_2$ to $C_3$ chlorofluoroolefins are chlorotrifluoroethylene, tetrafluorodichloropropylene, chloropentafluoropropylene, dichlorotrifluropropylene, chlorotetrafluoropropylene, chlorotrifluoropropylene, and chlorodifluoropropylene. Of these, chlorotrifluoroethylene is preferred.

The aliphatic hydrocarbons having only one terminal ethylenically unsaturated group, i.e., hydrocarbon olefins, which are useful as optional comonomers in the interpolymers of this invention have the structure $CH_2=CR_2$ where each R may be hydrogen or an alkyl group, or together the two R's may be joined to form a cycloaliphatic group. These olefins contain from 2 to 8 carbon atoms and include such monomers as ethylene, propylene, 1-butene, 1-pentene, 1-hexene, 1-heptene, 1-octene, isobutylene, isopentene, methylenecyclohexane, methylenenorbornylene (only the exocyclic double bond is polymerizable), and various olefins containing branched chain alkyl groups such as 4-methyl-1-pentene, and 3,3-dimethyl-1-butene. These olefins are all characterized by having only one terminally ethylenically unsaturated group $CH_2=C<$. They are all free of aromatic groups, as styrene and similar compounds and are not useful in this invention. Of these olefins, ethylene is preferred.

Representative examples of the optional alkyl vinyl ethers are methyl vinyl ether, ethyl vinyl ether, propyl vinyl ether, hexyl vinyl ether, cetyl vinyl ether, lauryl vinyl ether, octyl vinyl ether, perfluoromethyl perfluorovinyl ether, 1-trifluoromethyl-2,2,2-trifluoroethyl vinyl ether, n-butyl perfluorovinyl ether, perfluoropropyl perfluorovinyl ether, 2,2,2-trifluoroethyl perfluorovinyl ether, 1,1,2-trifluoro-2-chloroethyl vinyl ether, 2-ethoxypentafluoropropylene, and ethyl trifluorovinyl ether. Of these, the fluorinated alkyl vinyl ethers are preferred.

Inert materials such as dyes or pigments or antioxidants may be incorporated into the polymers of this invention either by being included in the polymerization mixture or preferably by being mixed with the preformed polymers by means well known in the art such as sand milling or ball milling. When pigmented polymers are desired, usually from 20 to 60 parts of finely divided pigment per 100 parts of polymer are incorporated in the preformed polymers by sand or ball milling. Since the polymers of this invention are essentially transparent to ultraviolet light, absorbers of ultraviolet light may also be incorporated into the polymers if the substrate being treated is itself sensitive to ultraviolet light, as in the case of most woods.

The polymers of the present invention may be applied as protective coatings on a number of different types of substrates which include ferrous metals such as iron and steel, ferrous alloys such as stainless steel, nonferrous metals such as aluminum, zinc, copper, and the like, and alloys thereof, wood of all types including hardboard, cellulose products such as paper and other construction materials such as concrete, plastics, brick, asphalt, etc., rigid vinyl plastics, and polyester-bonded fibrous glass materials. The polymers are particularly useful as protective coatings on cellulosic substrates such as wood, hardboard, and paper. The polymer coatings may be applied to metals directly or may be applied over metals which have been surface treated with anticorrosion precoatings such as in the case of an anodized surface on aluminum. The preferred method of application involves dissolving the polymers in a common organic solvent such as cyclohexanone, methyl ethyl ketone, dimethylacetamide, ethyl acetate, butyl acetate, tetrahydrofuran, or mixed solvents such as xylene/cyclohexanone or methyl ethyl ketone/toluene/butyl acetate and then applying the solutions to the surface by brushing, spraying or dipping. Evaporation of the solvent at ambient temperatures leaves a continuous coalesced film which is durable and weather resistant. Other application techniques such as melt extrusion, melt coating or flame spraying may be used. The solvent method is preferred, however, because of the excellent solubility of the invention polymers in a variety of common solvents.

In preparing coatings with the polymers of this invention, a ketonic solvent solution of the polymer is applied to the surface and the solvent is allowed to evaporate under ordinary conditions to yield completely coalesced coatings. The drying of the coating may be accelerated for purposes such as assembly line production by a short heat treatment, say, 65° C. to 200° C., for one to two minutes to remove the solvent. The heat treatment is not necessary to give coalesced, continuous films, however, since the invention polymers coalesce well at ambient temperatures. The coating thickness is variable at will and is adjusted by the control of the concentration of polymer in the solution and the amount of solution applied. Coatings of one mil thickness have been found particularly suitable for most purposes. Ten to thirty percent by weight solutions of the polymer in methyl ethyl ketone have been found particularly useful, but a wide range of other concentrations can be used. Over cellulosic substrates, clear formulations are usually applied directly to the substrate although, for certain substrates such as wood, it may be preferable to prevent penetration of the fluoropolymer coating by first priming the substrate with a clear primer.

When pigmented coatings are desired, usually from 20 to 60 parts of finely divided pigments per 100 parts of polymer are incorporated in the preformed polymers by sand or ball milling. Pigments such as titanium dioxide and copper phthalocyanine work well in the polymer coatings of this invention, and the polymers are stable in the presence of these pigments. On cellulosic substrates, it is usually preferable, in order to conserve the fluorocarbon polymer-containing paint, to first prime the substrate with a primer coating such as the well-known commercial acrylic resin emulsion primers followed by application of the fluorocarbon paint over the primer coat.

The polymers of the present invention are medium to high molecular weight materials having molecular weights in excess of 3,000, with upper limits of about 1,000,000. It has been found, however, that inherent viscosity is a far more useful characteristic of the present polymers than molecular weight since the usefulness of the polymers as coating materials is directly related to their inherent viscosities without reference to molecular weight. The polymers of this invention have inherent viscosities of at least 0.3 as 0.5% solutions by weight in dimethylformamide at 30° C. The polymers of this invention having inherent viscosities of 0.4 to 1.0 are preferred. The inherent viscosity is derived from the equation $$n_i = \frac{1}{c} \ln [n/n_o]$$

wherein $n_i$ is the inherent viscosity, $n$ is the measured viscosity of the 0.5% solution in dimethylformamide, $n_o$ is the measured viscosity of pure dimethylformamide, $\ln$ is the natural logarithm, and $c$ is the concentration of polymer in grams/100 ml. of solution. The method of measurement used herein was the capillary or Ostwald method. For further details on viscosity measurements, see Weissberger, "Techniques of Organic Chemistry," vol. 1, part 1, third edition, p. 689 et seq.

The polymers of this invention readily yield when subjected to tension and are capable of extensive elongation. The yield strength of films made from the polymers of the present invention, as measured on a testing machine of the constant rate-of-crosshead-movement type operating at room temperature and at a crosshead speed of 0.5 cm./min., is less than 1500 p.s.i. Under the same conditions of measurement, the films made from the polymers of this invention possess elongations at failure of from about 300% to greater than 1000%. Preferred polymers have a yield point of less than 1000 p.s.i. The interpolymers of this invention have an elastic modulus less than $20 \times 10^3$ p.s.i. and preferably less than $15 \times 10^3$ p.s.i. The polymers of the present invention also exhibit a good degree of recovery on relaxing after deformation.

Preferred compositions according to this invention are copolymers having 65% to 75% by weight of chain units derived from vinylidene fluoride, 15% to 30% by weight of chain units derived from tetrafluoroethylene, and 5% to 20% by weight of chain units derived from the defined vinyl ester. A particularly preferred composition contains 65% to 70% by weight of chain units from vinylidene fluoride, 18% to 27% by weight of chain units from tetrafluoroethylene, and 8% to 15% by weight of chain units from vinyl butyrate. These preferred polymers should also have an inherent viscosity of 0.4 to 1.0 as 0.5% solutions in dimethylformamide at 30° C.

It has been stated above that the polymers of this invention are prepared by heating vinylidene fluoride, tetrafluoroethylene, and the vinyl ester of an alkane monocarboxylic acid under pressure in the presence of free radical generating initiators and a substantially inert polymerization medium. The medium may be an organic solvent or water, organic media being preferred. Many useful organic solvents or solvent combinations are known. These include the lower molecular weight, straight chain, saturated fatty acids such as acetic acid, tertiary alcohols such as tertiary-butyl alcohol or tertiary-amyl alcohol, saturated, straight chain aliphatic nitriles such as acetonitrile, dialkyl sulfoxides such as dimethyl sulfoxide, chlorofluorocarbons and fluorocarbons such as 1,1,2-trichloro-1,2,2-trifluoroethane, perfluorodimethylcyclobutane or perfluorodimethylcyclohexane and certain inert esters such as dimethyl carbonate and 2,2,3,3-tetrafluoropropyl acetate. The preferred organic medium is dimethyl sulfoxide. The use of dimethyl sulfoxide allows the preparation of higher molecular weight polymers of more uniform composition under otherwise equivalent conditions than most other media. Solvent combinations such as trichlorotrifluoroethane with acetonitrile or acetic acid, tertiary-butyl alcohol with acetic acid, acetic acid with monochlorodifluoromethane or tetrafluoropropyl acetate with acetic acid are also useful. The amount of medium used should be sufficient to disperse or dissolve the polymeric product. Generally, the weight of medium should at least equal the weight of the reactants.

When water is employed as the polymerization medium, it is usually preferred to employ emulsion polymerization procedures well known to those skilled in the art; see, for example, Chapter 12 of F. W. Billmeyer, Jr., Textbook of Polymer Science, Interscience Publishers, New York, 1962, or Chapter 4 of C. E. Schildknecht, Polymer Processes, Interscience Publishers, New York, 1956. Preferred emulsifying agents are fluorinated surfactants such as highly fluorinated acids and their salts. Specific useful fluorinated surfactants include the fluoroalkyl phosphates described in U.S. Patent 3,083,224 and salts of fluorocarboxylic acids such as ammonium perfluorooctanoate. Usually it is also desirable to use a small amount of a fluorinated surfactant even when other surfactants are employed. The surfactants should be used in from about 0.01% to about 2% of the weight of the water used in the polymerization.

In organic polymerization media, organic peroxides or azo initiators which are soluble in the reaction solvent are used as the free radical generating initiators. Peroxides such as dilauroyl peroxide, benzoyl peroxide or t-butyl peroxypivalate which serve as initiators below 100° C. are most useful since chain transfer with the reaction media is minimized at lower temperatures. In cases where the polymerization will not proceed well below 100° C., other peroxy esters and higher temperatures, e.g., 100° C. to 120° C. can be used. In reactions which are particularly difficult to initiate, di-tert-alkyl peroxides such as di-tert-butyl peroxide or di-tert-amyl peroxide at 120° C. to 140° C. are recommended. The azo compounds useful as initiators in organic medium are well known to those skilled in the art and include azobis(isobutyronitrile) and other azo compounds such as those described in U.S. Patent 2,559,630. In aqueous media, water soluble peroxygen compounds and azo compounds are useful initiators. Redox initiator systems may also be used. Such systems are well known to those skilled in the art and have been described in numerous patents and references; see, for example, C. Walling, Free Radicals in Solution, John Wiley and Sons, New York, 1957, Chapter 11. The amounts of initiator to be used in the process of this invention may be varied over a considerable range depending on the results that are desired. Preferred initiator concentrations are from 0.001% to about 1% of the liquid reaction medium.

As a general rule, the reaction should be carried out at as low a temperature as possible since this minimizes the tendency of the organic medium to enter into the reaction. A second mode of minimizing organic medium participation is by the use of higher pressures which increase the concentration of the more volatile monomers such as vinylidene fluoride and tetrafluoroethylene in the organic medium. This increases the probability of chain propagation over chain transfer with the medium. Higher pressures are particularly useful to keep temperatures to a minimum.

The copolymerization is carried out in a sealed system which is adapted to withstand the pressures used in the reactor. These may range from 100 p.s.i.g. to as high as 10,000 p.s.i.g. Either batch or continuous systems may be used. The materials of construction for the reaction system require no special consideration except that they must be capable of withstanding the temperatures and pressures used. Generally, steel, "Monel," "Inconel," "Hastelloy," or stainess steel are used.

The reactants, polymerization medium and initiator are added to the pressure vessel in the batch system and heated, usually with agitation, until the reaction stops. Once initiated, many of these polymerizations are exothermic, and care should be taken to maintain temperature control. When the reaction is completed, any unreacted gaseous monomers are removed or recovered. When an organic polymerization medium is employed, the liquid reaction mass, which may be a solution or a slurry, is diluted with ethyl alcohol or other solvent which causes the polymeric product to precipitate completely. When an aqueous polymerization system is used, the polymer may separate as a solid powder during the reaction or may remain emulsified or dispersed and require coagulation by addition of such a coagulation agent as sulfuric acid or a polyvalent inorganic salt. The precipitated polymer is separated by filtration, washed with alcohol and/or water, and dried to constant weight.

In a continuous process, which is the preferred process, the solids and liquid monomers being used and the initiator are dissolved in an organic polymerization medium. The resulting solution is pumped into an agitated pressure vessel which is liquid-full of reaction mixture at the desired reaction temperature. At the same time, gaseous monomers such as vinylidene fluoride and tetrafluoroethylene under pressure are forced into the reaction vessel. The pressure within the vessel is maintained at or above autogenous pressure by a pressure release valve in the exit line which opens when its release pressure is reached. Since reactants are continuously pumped into the vessel, product is continuously discharged from the system through the pressure release valve. The liquid end product is usually diluted with alcohol or other solvent to completely precipitate the copolymer which is then further treated as in the batch process. The continuous process produces a more uniform product than the batch process, probably because of the fact that a continuous operation makes it possible to maintain more uniform concentrations of reactants at all times. In a batch process, the concentrations of reactants vary as they are consumed. In operating the continuous process, it is especially preferred to use dimethyl sulfoxide as the polymerization medium. Pressures for this process are preferably above autogenous pressure, and more preferably about 1200 to 1500 p.s.i.g. The preferred reaction temperature in most cases is from 55° C. to 100° C. Feed rates are adjusted to produce maximum conversion which usually involves average residence times of 1.0 to 2.0 hours under the preferred conditions cited. It is understood of course that the preferred conditions vary somewhat with the initiator and the combination of monomers used. When low temperature initiators are used, two separate liquid feeds are employed, one of initiator dissolved in one-half of the reaction medium and the other of vinyl monomers dissolved in the remainder of the reaction medium.

The polymers of this invention possess several properties which make them especially useful as coating materials. They are stable compositions with good tear strength, and they possess excellent resistance to deterioration upon outdoor exposure. They are readily soluble in many organic solvents, thus making it relatively easy to prepare coating formulations of high solids content and easy to apply them to the surface to be protected. Moreover, most of the polymers are soluble in solvents such as ketones and esters which are conventional solvents for coating compositions. The polymers also exhibit low yield points and good elongation when in tension, properties which are desirable for coatings on substrates such as wood which undergo dimensional changes with environmental change. The invention interpolymers are readily pigmented and shown good compatibility with a variety of pigments.

Representative examples, illustrating the present invention follow. These examples are intended to be merely illustrative of the invention and not in limitation thereof. Unless otherwise specified, all parts are by weight.

In the infrared spectra of the interpolymers, the carbonyl group or groups of the ester components give absorption peaks at about 5.7 microns. The extent of this absorption is related to the concentration of the carbonyl groups present. For the present interpolymers, the maximum absorbance in this carbonyl absorption region (at about 5.7 microns) was determined using a 10% by weight solution of the interpolymer in tetrahydrofuran contained in an infrared cell 0.412 mm. in thickness. The absorbance ($A_{5.7}$) value is directly proportional to the weight percent ester carbonyl group present, the proportionality factor used was derived from a series of vinyl ester interpolymers containing $C^{14}$-tagged carbonyl groups wherein the vinyl ester concentration was known from radioactivity measurements.

The thermal properties of the polymers including the crystalline melting point $T_m$ (a first order transition temperature) and the glass transition temperature $T_g$ (a second order transition temperature) were determined by standard methods utilizing differential thermal analysis as described by Ke, Newer Methods of Polymer Characterization, Interscience Publishers, New York, 1964, Chapter 9. The mechanical behavior of the interpolymers was measured by standard tensile stress-strain techniques using a testing machine of the constant-rate-of-crosshead-movement type. Mechanical properties determined were the yield point ($T_y$), tensile strength at failure ($T_B$), elongation at failure ($E_B$), and modulus of elasticity.

Accelerated weathering tests were conducted in an "Atlas Weather-Ometer," Model XW (Atlas Electrical Devices Co., Chicago, Ill.). The test pieces were continuously subjected to light of a carbon arc passed through Corex D glass filters and for 18 minutes out of every two hours were also subjected to a spray of distilled water. Both pigmented and clear interpolymer coatings on wood and metal substrates were checked for adhesive failure with pressure-sensitive cellophane tape. Pigmented coatings were checked for failure due to chalking by firmly rubbing piece of black velvet across the coating. Chalking failure was judged to be the appearance of the first trace of white on the velvet.

A general batch procedure for the preparation of the invention interpolymers used in a majority of the following examples consisted of the charging under dry nitrogen to a nitrogen-purged, 420 ml. stainless steel-lined pressure vessel the liquid polymerization medium, the initiator and the liquid monomers. After sealing the pressure vessel and pressure testing with nitrogen, it was cooled in a mixture of Dry Ice and acetone, evacuated and charged by weight difference with vinylidene fluoride, tetrafluoroethylene and any other gaseous monomer desired in the polymer. The tetrafluoroethylene was freed of inhibitor prior to charging by passage through a column of silica gel. The polymerization mixture at autogenous pressure was heated with agitation to and maintained at the reaction temperature until the desired degree of polymerization was achieved as indicated by the decrease in pressure. The polymerization mixture was then cooled to room temperature, the reaction vessel vented, and the product discharged. Polymer was isolated by addition to a rapidly agitated (e.g., a Waring blender) three-fold volume of methanol or ethanol. Following separation of the polymer from the alcohol by filtration, it was washed thoroughly with additional alcohol and was dried to constant weight in a vacuum oven at 60° C. to 80° C.

Example 1.—Vinylidene fluoride/tetrafluoroethylene/ vinyl butyrate terpolymer

According to the above batch procedure, a terpolymer was prepared from 120 g. vinylidene fluoride, 30 g. tetrafluoroethylene, and 21 g. of vinyl butyrate using 0.3 ml. of a 75% solution of t-butyl peroxypivalate in mineral spirits as initiator, and a solution of 180 ml. of acetic acid and 10 ml. of t-butanol as the polymerization medium. The initial reaction temperature of 50° C. was raised by 2° increments at 2-hour intervals to 65° C. giving a total reaction time of 14 hours. From the polymerization mixture was isolated 114 g. of dried terpolymer. A 0.5% by weight solution of the polymer in dimethylformamide had an inherent viscosity of 0.89 at 30° C.

Elemental analysis of the polymer product gave the following results: Carbon, 36.3%; hydrogen, 3.4%; fluorine, 54.1%.

The infrared spectrum of the polymer showed an absorbance at 5.7 microns of 1.28 which corresponds to 15% by weight of the polymer chain units being derived from vinyl butyrate. From the vinyl butyrate content and the elemental analysis, the terpolymer was calculated to contain 63% by weight of chain units derived from vinylidene fluoride and 22% by weight from tetrafluoroethylene.

A film of the terpolymer cast onto glass from a 10% by weight solution in a 60/40 by volume mixture of methyl ethyl ketone and cyclohexanone was allowed to dry at room temperature. The tack-free dry film was removed from the glass to give an unsupported, colorless, tough, somewhat rubbery film. Another film sample of this terpolymer cast from cyclohexanone exhibited a tensile strength at yield of 330 p.s.i., a tensile failure of 550 p.s.i., and elongation at failure of 412%.

Clear, colorless, attractive 1-mil coatings of the terpolymer on redwood were obtained by spray application of a solution of 6 parts by weight of the terpolymer in 50 parts by volume of a 1/1 by volume mixture of methyl ethyl ketone/cyclohexanone. After over one year exposure conditions, such commercial coatings as alkyd, celerated weathering in the "Atlas Weather-Ometer" the coating was unchanged in appearance except for a whitening of the wood beneath the coating. The panel was removed from the "Weather-Ometer" after 3260 hours because some adhesive failure was noted at the wood-coating interface although the polymer coating itself remained unchanged in appearance. Brush-applied coatings 3 mils in thickness from the same polymer solution did not show incipient adhesive failure until after 4,340 hours in the "Weather-Ometer." Similar results were obtained from coatings on redwood laid down from the terpolymer solution in cyclohexanone and in butyrolactone.

A paint was prepared from the terpolymer using the following formulation: terpolymer, 25 g.; cyclohexanone, 80 ml.; titanium dioxide pigment, 12.5 g.; lampblack, 0.5 g.; "Monastral" Green B pigment (Colour Index No. 10006), 2.0 g. The terpolymer was dissolved in the solvent, the pigment mixture was placed in a pebble mill, and the terpolymer solution was added. The slurry was milled for 7 days. The resulting paint was separated from the pebbles and was used to coat panels of a construction material comprising a filled polyamide having the surface primecoated with an epoxy resin. The paint was applied by brush application and was allowed to dry at room temperature. On exposure of the coating in the "Weather-Ometer," the onset of chalking was noted, as evidenced by the first trace of white on black velvet rubbed firmly across the panel, at 3000 hours. No change in the coating was noted after 6 months exposure out of doors. When an air-dried coating of the paint, which had been brush-applied to a pigmented polyvinyl fluoride film laminated onto aluminum, was exposed in the "Weather-Ometer," the onset of chalking was noted at 2500 hours exposure. In comparison under the same "Weather-Ometer" exposure conditions, such commercial coatings as alkyd, epoxy, vinyl, and urethane paints showed definite failure by chalking in less than 500 hours.

Example 2.—Vinylidene fluoride/tetrafluoroethylene/ vinyl acetate terpolymer

The batch procedure was repeated as in Example 1 using 180 ml. acetic acid, 10 ml. t-butanol, 120 g. vinylidene fluoride, 30 g. tetrafluoroethylene, 14 g. of vinyl acetate, and 0.3 ml. of a 75% solution of t-butyl peroxypivalate in mineral spirits. The polymerization mixture was heated at 50° C. to 65° C. for 14 hours. The isolated dry terpolymer weighed 111 g. A 0.5% by weight solution of the polymer in dimethylformamide had an inherent viscosity of 0.51 at 30° C.

Elemental analysis of the polymer product showed: Carbon: 36.3%, 36.0%; hydrogen: 2.7%, 2.5%; fluorine: 56.0%, 56.2%.

The infrared spectrum of the polymer, as determined in tetrahydrofuran solution as described hereinbefore, showed an absorbance at 5.7 microns of 1.30 which corresponds to 11.3% by weight of the polymer chain units being derived from vinyl acetate. This, together with the elemental analysis, shows that the terpolymer contains 67.9% units from vinylidene fluoride and 20.8% units from tetrafluoroethylene.

The polymer was soluble in methyl ethyl ketone and cyclohexanone. A film cast from the latter solvent was soft, slightly cloudy, colorless, tough. Tensile measurements indicated a yield point of 508 p.s.i. and an elongation of about 700%.

Using the same formulation and procedure described in Example 1, a paint was prepared and one coat was applied by brush to composite laminated sheeting having a surface of polymethylmethacrylate. The coating was allowed to dry for about 2 weeks at room temperature. An X-cut was made through the coating, cellophane adhesive tape was pressed firmly over the X-cut and pulled away. No loss in coating adhesion occurred. The coated panel was then soaked in water at room temperature for 7 days and the adhesion at the X-cut remained excellent. A brush-applied coating of the paint over steel primed with a zinc-rich primer was allowed to air dry at room temperature for one week and then was placed in a carbon arc "Weather-Ometer" from which the Corex D glass filters had been removed. Chalking was first noted after 600 hours, whereas under the same "Weather-Ometer" conditions commercial coatings of epoxy, vinyl, and urethane paints showed the same levels of chalking after only 150 hours and an alkyd paint was at the same level of chalking at 250 hours.

Example 3.—Vinylidene fluoride/tetrafluoromethylene/ vinyl propionate terpolymer The batch procedure of Example 1 was repeated using 250 ml. of dimethylsulfoxide, 120 g. of vinylidene fluoride, 30 g. of tetrafluoroethylene, 9.1 g. of vinyl propionate, and 0.4 ml. of a 75% solution of t-butyl peroxypivalate in mineral spirits. The polymerization mixture was heated to 55° C. and then the temperature was raised to 65° C. in one hour at which temperature an exothermic reaction occurred elevating the temperature to 117° C. The polymerization mixture was quickly cooled to 65° C. After a total reaction time of two hours during which the maximum pressure developed was 1200 p.s.i.g., the mixture was cooled to room temperature. The polymer was isolated as before, yielding 107 g. The inherent viscosity of the polymer, determined as 0.5% solution in dimethylformamide at 30° C. was 0.55.

Elemental analysis of the polymer product showed: Carbon: 36.2%, 36.2%; hydrogen: 2.9%, 3.0%; fluorine: 58.0%, 58.0%.

The infrared spectrum of the polymer as determined in tetrahydrofuran solution as described hereinbefore showed an absorbance at 5.7 microns of 0.71. The composition of the polymer thus was 76.2% vinylidene fluoride units, 16.7% tetrafluoroethylene units and 7.0% vinyl propionate units.

The polymer was highly soluble in ketonic solvents. A 40% solution in methyl ethyl ketone exhibited a viscosity of 10 stokes at 25° C. A clear, colorless, highly flexible, tough film of the polymer was formed by hot pressing at 150° C. The film was cold drawable and could be manually drawn about seven times. Tensile tests indicated a yield point of 1370 p.s.i., a tensile at failure >1800 p.s.i., and an elongation at failure of >600%. A sample of film cooled to −50° C. was still flexible.

Example 4.—Vinylidene fluoride/tetrafluoroethylene/ vinyl pivalate terpolymer

The batch procedure of Example 1 was repeated using 250 ml. of dimethylsulfoxide, 80 g. of vinylidene fluoride, 20 g. of tetrafluoroethylene, 10 g. of vinyl pivalate, and 0.5 ml. of a 75% solution of t-butyl peroxypivalate in mineral spirits. The polymerization mixture was heated at 40° C. to 43° C. for 8 hours. From the polymerization mixture was isolated 77 g. of a white solid polymer. This polymer exhibited good solubility in methyl ethyl ketone, cyclohexanone, tetrahydrofuran and dimethylformamide. A 0.5% by weight solution of the polymer in dimethylformamide had an inherent viscosity of 0.57 at 30° C. Fibers could readily be drawn from the molten polymer. A film of the polymer cast from cyclohexanone was tough and somewhat rubbery. A film of the polymer, hot pressed at 160° C., exhibited a yield point of 1323 p.s.i., a tensile at failure of 2890 p.s.i., and an elongation at failure of 580%.

The polymer contained 54.7% fluorine and had an absorbance at 5.7 microns of 0.96 in the infrared. The composition of the polymer was thus 76.8% by weight vinylidene fluoride units, 12.0% tetrafluoroethylene units, and 11.2% vinyl pivalate units.

Example 5.—Vinylidene fluoride/tetrafluoroethylene/ vinyl isobutylrate terpolymer Example 1 was repeated using 180 ml. of acetic acid, 10 ml. of t-butanol, 120 g. of vinylidene fluoride, 30 g. of tetrafluoroethylene, 21.5 g. of vinyl isobutyrate, and 0.3 ml. of a 75% solution of t-butyl peroxypivalate in mineral spirits. The polymerization was conducted at 50° C. to 65° C. over a period of 14 hours. After drying, the isolated polymer weighed 93 g. Elemental analysis indicated that the polymer contained 52.3% fluorine. The composition of the polymer corresponds to 63.0% vinylidene fluoride units, 21.7% tetrafluoroethylene units and 18% units derived from vinyl isobutyrate. The polymer was soluble and formed clear, tough films which were completely coalescible at room temperature from ketonic solvents. Differential thermal analysis measurements indicated a glass transition temperature of −20° C. and a crystalline melting point of 132° C. Tensile measurements on a film of the polymer prepared by hot pressing showed tensile at failure of 2205 p.s.i., elongation at failure of 647%, and an elastic modulus of $15.9 \times 10^3$ p.s.i.

Example 6.—Vinylidene fluoride/tetrafluoroethylene/ vinyl n-hexoate terpolymer

The batch procedure of Example 1 was repeated using 180 ml. of acetic acid, 10 ml. of t-butanol, 120 g. of vinylidene fluoride, 30 g. of tetrafluoroethylene, 21 g. of vinyl n-hexanoate, and 0.3 ml. of a 75% solution of t-butyl peroxypivalate in mineral spirits. The polymerization was conducted at 50° C. to 65° C. over a period of 14 hours. The dry isolated polymer weighed 115 g. Analyses indicated that the polymer contained 55.8% units derived from vinylidene fluoride, 28.7% units derived from tetrafluoroethylene, and 15.5% units derived from vinyl n-hexanoate. A solution containing 0.5% by weight of the polymer in dimethylformamide at 30° C. exhibited an inherent viscosity of 0.88. The polymer was highly soluble in ketonic solvents, and a film cast from a solution of the polymer in a mixture of methyl ethyl ketone and cyclohexanone was soft, pliable, and somewhat rubbery. A hot-pressed film of the polymer exhibited a tensile at failure of 2315 p.s.i., an elongation at failure of 17%, and an elastic modulus of $11.6 \times 10^3$ p.s.i. Differential thermal analysis indicated that the glass transition temperature of the polymer was −16° C. and the crystalline melting point was 128° C.

Example 7.—Vinylidene fluoride/tetrafluoroethylene/ vinyl ester of $C_{10}$ acid terpolymer Using the batch procedure of Example 1, 180 ml. of acetic acid, 10 ml. of t-butanol, 120 g. of vinylidene fluoride, 30 g. of tetrafluoroethylene, 21.0 g. of a commercially available vinyl ester of a saturated tertiary carboxylic acid of 10 carbon atoms, and 0.3 ml. of a 75% solution of t-butyl peroxy-pivalate in mineral spirits. This polymerization mixture was maintained at 50° C. to 65° C. under autogenous pressure for 14 hours. After isolation of the polymer as before, the yield of dried polymer was 56 g. Analysis indicated a composition of 55% vinylidene fluoride units, 15.5% tetrafluoroethylene units, and 29.5% of the vinyl ester units. The inherent viscosity of a 0.5% by weight solution of the polymer in dimethylformamide at 30° C. was 0.37. The polymer was readily soluble in ketonic solvents such as methyl ethyl ketone and cyclohexanone. Films cast from these solvents were soft, rubbery, clear and slightly tacky. A 1-mil coating of the polymer, spray applied to redwood from a methyl ethyl ketone/cyclohexanone solution was allowed to dry at room temperature and then was exposed in the "Weather-Ometer." The coating was unchanged in appearance after >1000 hours exposure in the "Atlas Weather-Ometer."

Example 8.—Vinylidene fluoride/tetrafluoroethylene/ vinyl butyrate terpolymer

According to the batch method of Example 1, 180 ml. of acetic acid, 10 ml. of t-butanol, 120 g. of vinylidene fluoride, 30 g. of tetrafluoroethylene, 10.8 g. of vinyl butyrate, and 0.3 ml. of a 75% solution of t-butyl peroxy-pivalate in mineral spirits was heated at 50° C. to 65° C. for 14 hours. The polymer which formed was isolated as before. After drying, this polymer weighed 107 g. Analysis indicated the composition of the polymer corresponded to 78.0% vinylidene fluoride, 14.1% tetrafluoroethylene and 7.9% vinyl butyrate. The inherent viscosity of the polymer as determined at 0.5% solids in dimethylformamide solution at 30° C. was 0.70. The polymer was soluble in ketonic solvents, and films of the polymer cast from such solvents and allowed to dry at room temperature were completely coalesced, clear, tough and somewhat rubbery. Differential thermal analysis indicated a glass transition temperature of −8° C. and a crystalline melting point of 135° C. A spray-applied coating of the polymer on redwood after drying at room temperature showed no failure in the "Atlas Weather-Ometer" after over 1000 hours of exposure.

Example 9.—Vinylidene fluoride/tetrafluoroethylene/ vinyl butyrate terpolymer

The batch procedure of Example 8 was repeated using the same reactants but increasing the amount of vinyl butyrate to 43.2 g. and decreasing the amount of acetic acid to 165 ml. The polymeric product was obtained in a yield of 62 g. It had a composition corresponding to 45.2% vinylidene fluoride, 21.8% tetrafluoroethylene and 33% vinyl butyrate. The inherent viscosity of this polymer determined as before was 0.80. Differential thermal analysis showed a glass transition temperature of 0° C. and a crystalline melting point of 135° C. The polymer was soluble in ketonic solvents and films cast from these solvents were coalesced at room temperature to clear, soft, somewhat rubbery, slightly tacky films. A 1-mil coating spray applied onto redwood from a solution in a mixture of methyl ethyl ketone and cyclohexanone showed no failure after an exposure for 1000 hours in the "Atlas Weather-Ometer."

Example 10.—Vinylidene fluoride/tetrafluoroethylene/ vinyl propionate terpolymer The batch procedure of Example 8 was repeated except that vinyl butyrate of Example 8 was replaced with 22.3 g. of vinyl propionate. The yield of solid white polymer was 109 g. This polymer composition was 66.5% vinylidene fluoride units, 15.6% tetrafluoroethylene units and 17.9% vinyl propionate units. The inherent viscosity of the polymer determined at 0.5% solids in dimethylformamide at 30° C. was 0.88. The polymer was soluble in ketonic solvents, and soft, tough, pliable films were cast from solutions of the polymer in these solvents at room temperature. The glass transition temperature of the polymer was 4° C., and the crystalline melting point was 140° C. as determined by differential thermal analysis. Tensile measurements on a hot-pressed film of the polymer showed a yield point of 794 p.s.i., a tensile at failure of 2940 p.s.i., an elongation at failure of 794%, and an elastic modulus of $11.7 \times 10^3$ p.s.i. The polymer obtained was spray applied to redwood from a solution in a mixture of methyl ethyl ketone and cyclohexanone. The resulting 1-mil coating which formed after drying at room temperature showed no failure after >1000 hours exposure in the "Atlas Weather-Ometer."

Example 11.—Vinylidene fluoride/tetrafluoroethylene/ vinyl acetate terpolymer

The batch procedure of Example 8 was repeated except the amount of acetic acid was increased to 190 ml. and the vinyl butyrate of Example 8 was replaced by 14.0 g. of vinyl acetate. The yield of polymer was 100 g. Analysis indicated that the polymer composition was 41.6% vinylidene fluoride units, 45.9% tetrafluoroethylene units and 12.5% vinyl acetate units. The inherent viscosity determined as before was 0.67. The polymer was highly soluble in ketonic solvents and formed tough, pliable films. An air-dried coating of the polymer on redwood was unchanged after more than 1000 hours exposure in the "Atlas Weather-Ometer." Another polymer, prepared under identical conditions, was hot-pressed to a film which tensile measurements showed possessed a yield point of 938 p.s.i., a tensile at failure of 2425 p.s.i., an elongation at failure of 733%, and an elastic modulus of $8.1 \times 10^3$ p.s.i. Differential thermal analysis of this polymer showed a glass transition temperature of 7° C. and a crystalline melting point of 133° C.

Example 12.—Vinylidene fluoride/tetrafluoroethylene/ vinyl butyrate terpolymer

Example 1 was repeated using 250 ml. of dimethylsulfoxide, 80 g. of vinylidene fluoride, 20 g. of tetrafluoroethylene, 2.7 g. of vinyl butyrate, and 0.1 g. of azobis(isobutyronitrile). The polymerization was conducted at 65° C. to 80° C. at autogenous pressure for 7.4 hours. The yield of polymer after isolation as before was 52 g. Analysis showed the polymer to contain 81.6% units derived from vinylidene fluoride, 12.7% units from tetrafluoroethylene, and 5.6% units from vinyl butyrate. The inherent viscosity was 0.45, determined at a 0.5% solution by weight in dimethylformamide at 30° C. The polymer was soluble in ketonic solvents. From a solution in methylethyl ketone was cast a film which after air drying at room temperature was flexible, slightly cloudy, and somewhat rubbery. The film could be cold drawn. Long fibers were readily drawn from the molten polymer. A hot-pressed (150° C.) film of the polymer showed a yield point of 1540 p.s.i., a tensile at failure of 1762 p.s.i., an elongation at failure of 725%, and an elastic modulus of $7.6 \times 10^3$ p.s.i.

Example 13.—Vinylidene fluoride/tetrafluoroethylene/ vinyl butyrate terpolymer

The batch procedure of Example 1 was repeated using 250 ml. of dimethyl carbonate, 120 g. of vinylidene fluoride, 30 g. of tetrafluoroethylene, 13.5 g. of vinyl butyrate, and 0.4 ml. of a 75% solution of t-butyl peroxypivalate in mineral spirits. The polymerization was conducted at 55° C. to 65° C. for 6.5 hours at autogenous pressure. The yield of dry polymer was 146 g. The polymer contained 83.8% vinylidene fluoride units, 6.3% tetrafluoroethylene units, and 9.9% vinyl butyrate units. The inherent viscosity determined as in Example 1 was 0.90. The polymer was soluble in ketonic solvents from which clear, tough, somewhat rubbery films were cast. Short fibers were drawn from the molten polymer. Tensile measurements on a hot-pressed film of the polymer indicated a yield point of 1370 p.s.i., a tensile at failure of 3150 p.s.i., an elongation at failure of 600%, and an elastic modulus of $17.7 \times 10^3$ p.s.i.

Example 14.—Vinylidene fluoride/tetrafluoroethylene/ vinyl butyrate terpolymer

Following the batch procedure of Example 1, 200 ml. of dimethylsulfoxide, 140 g. of vinylidene fluoride, 35 g. of tetrafluoroethylene, 18 g. of vinyl butyrate, and 0.6 g. of lauroyl peroxide were maintained at 60° C. to 90° C. for a period of 16 hours under autogenous pressure. The yield of dry polymer was 88 g. Analysis indicated that this polymer contained 79.5% vinylidene fluoride, 8.8% tetrafluoroethylene, and 11.6% vinyl butyrate. The inherent viscosity, determined as in Example 1, was 0.74. The polymer was soluble in ketonic solvents and formed a tough, rubbery film when hot-pressed at 150° C. This film possessed a yield point of 970 p.s.i., a tensile at failure of 3450 p.s.i., an elongation at failure of 870%, and an elastic modulus of $10.4 \times 10^3$ p.s.i.

Example 15.—Vinylidene fluoride/tetrafluoroethylene/ vinyl butyrate/ethylene tetrapolymer The batch procedure of Example 1 was repeated using 250 ml. of dimethylsulfoxide, 100 g. of vinylidene fluoride, 40 g. tetrafluoroethylene, 10 g. of ethylene, 13.5 g. of vinyl butyrate, and 0.5 ml. of a 75% solution of t-butyl peroxypivalate in mineral spirits. The polymerization was conducted at 55° C. to 67° C. for 4 hours. There was isolated 87.5 g. of a white, dry polymer.

Elemental analysis of the polymer product gave the following results: Carbon; 41.3%, 41.4%; hydrogen; 4.0%, 3.9%; fluorine; 52.3%, 52.0.

The infrared spectrum showed $A_{5.7}$ to be 1.15 which corresponds to 13.0% by weight of incorporated vinyl butyrate. The spectrum also was consistent with the presence of ethylene-derived units in the polymer. Inherent viscosity, determined as in Example 1, was 0.43. A film of the tetrapolymer pressed at 150° C. was clear, soft and flexible having a yield point of 620 p.s.i., a tensile at failure of 2000 p.s.i., an elongation at failure of 525%, and an elastic modulus of $9.05 \times 10^3$ p.s.i.

Example 16.—Vinylidene fluoride/tetrafluoroethylene/ chlorotrifluoroethylene/vinyl butyrate tetrapolymer The batch procedure of Example 1 was repeated using 235 ml. of acetic acid, 150 g. of vinylidene fluoride, 38 g. of tetrafluoroethylene, 20 g. of chlorotrifluoroethylene, 18 g. of vinyl butyrate, and 0.5 g. of lauroyl peroxide. The polymerization was conducted at 53° C. to 109° C. over a period of 5 hours at autogenous pressure. One hundred sixteen grams of white solid polymer was isolated. Elemental analysis of the polymer product gave the following results percent: F, 53.0; Cl 4.0. The absorbance at 5.7 microns in the infrared spectrum was 1.29. The analysis corresponded to a composition of 48.5% vinylidene fluoride, 23.4% tetrafluoroethylene, 13.1% chlorotrifluoroethylene, and 15.0% vinyl butyrate. The inherent viscosity of the polymer, determined by the method of Example 1, was 0.90. Soft, brilliantly clear, slightly rubbery films were cast from ketonic solvents. A hot-pressed film of the polymer was subjected to tensile measurements and showed a yield point of 309 p.s.i., a tensile at failure of 972 p.s.i., an elongation at failure of 1030%, and an elastic modulus of $2.1 \times 10^3$ p.s.i.

When equivalent amounts of hexafluoropropylene are substituted for the chlorotrifluoroethylene in the above preparation, a tetrapolymer is obtained having the proper balance of properties for forming durable, weather-resistant coatings.

Example 17.—Vinylidene fluoride/tetrafluoroethylene/ chlorotrifluoroethylene/vinyl ester of $C_{10}$ acid tetrapolymer The batch procedure of Example 16 was repeated using 230 ml. of acetic acid, 140 g. of vinylidene fluoride, 35 g. of tetrafluoroethylene, 20 g. of chlorotrifluoroethylene, and 17.5 g. of a commercially available vinyl ester of a saturated tertiary carboxylic acid of 10 carbon atoms. The polymerization mixture was heated at 55° C. to 68° C. at autogenous pressure for 8.5 hours. The yield of dry polymer was 112 g. Elemental analysis of the polymer product gave the following results: Fluorine, 54.3%; chlorine, 3.8%.

The infrared spectrum showed absorbance at 5.7 microns of 0.71. The composition of the polymer corresponds to 45.9% vinylidene fluoride, 27.5% tetrafluoroethylene, 12.5% chlorotrifluoroethylene, and 14.0% of the vinyl ester. The inherent viscosity, measured by the method described in Example 1, was 0.43. This polymer gave clear, soft, tough films from solutions in ketonic solvents. Long fibers were drawn from the melted polymer.

When equimolar amounts of trifluoropropylene are are substituted for chlorotrifluorethylene in the above procedure, a similar polymer product is obtained.

Example 18.—Vinylidene fluoride/tetrafluoroethylene/ vinyl acetate/vinyl ester of $C_{10}$ acid tetrapolymer The batch procedure of Example 1 was repeated using 250 ml. of dimethylsulfoxide, 120 g. of vinylidene fluoride, 30 g. of tetrafluoroethylene, 7.5 g. of vinyl acetate, 4.4 g. of the vinyl ester of a commercially available saturated tertiary carboxylic acid of 10 carbon atoms, and 0.4 ml. of a 75% solution of t-butyl peroxypivalate in mineral spirits. The polymerization was carried out at 55° C. to 66° C. for 2 hours at autogenous pressure. The yield of dry polymer was 51 g.

Elemental analysis of the polymer product gave the following results: Carbon: 39.8%, 39.7%; hydrogen: 3.2%, 3.0%; fluorine: 53.8%, 53.7%.

The infrared absorbance at 5.7 microns was 1.54. The inherent viscosity, measured as a 0.5% solution in dimethylformamide at 30° C. was 0.65. Films cast from solutions in ketonic solvents were soft, tough and clear. Tensile measurements conducted on hot-pressed films showed a yield point of 331 p.s.i., a tensile at failure of 1150 p.s.i., an elongation at failure of 970%, and an elastic modulus of $2.3 \times 10^3$ p.s.i.

Example 19.—Vinylidene fluoride/tetrafluoroethylene/ vinyl butyrate/2-methoxyethyl vinyl ether tetrapolymer Following the batch procedure of Example 1, 270 ml. of dimethylsulfoxide, 120 g. of vinylidene fluoride, 30 g. of tetrafluoroethylene, 13.5 g. of vinyl butyrate, 10 ml. of 2-methoxyethyl vinyl ether, and 0.4 ml. of a 75% solution of t-butyl peroxypivalate in mineral spirits were heated at 59° C. to 74° C. under autogenous pressure for 3.3 hours. From the polymerization mixture was isolated 135 g. of polymer.

Elemental analysis of the polymer product gave the following results: Carbon: 38.7%, 38.9%; hydrogen: 2.9%, 3.3%; fluorine: 54.1%, 53.9%.

The infrared spectrum of the polymer showed absorbance at 5.7 microns of 0.81. These analytical data correspond to a composition of 69% vinylidene fluoride, 17% tetrafluoroethylene, 9.1% vinyl butyrate, and 4.8% 2-methoxyethyl vinyl ether. The inherent viscosity, measured as a 0.5% solution in dimethylformamide at 30° C., was 0.68. The polymer was soluble in ketonic solvents and solutions in these solvents were cast to soft, somewhat rubbery, fairly tough films which coalesced at room temperature. In contrast to vinylidene fluoride/tetrafluoroethylene/vinyl butyrate terpolymers, the tetrapolymer was not appreciably soluble in acetonitrile. A hot-pressed film of the polymer was subjected to tensile tests and showed a yield point of 926 p.s.i., a tensile at failure of 2250 p.s.i., an elongation at failure of 860%, and an elastic modulus of $2.3 \times 10^3$ p.s.i.

Example 20.—Vinylidene fluoride/tetrafluoroethylene/ perfluoropropyl perfluorovinyl ether/vinyl butyrate tetrapolymer According to the batch procedure of Example 1, a 420 ml. pressure vessel was charged under an atmosphere of nitrogen with 120 ml. of t-butanol, 160 ml. of 2,2,3,3-tetrafluoropropyl acetate, 15 ml. of vinyl butyrate, 25 g. of perfluoropropyl perfluorovinyl ether, 0.4 ml. of a 75% solution of t-butyl peroxypivalate in mineral spirits, 120 g. of vinylidene fluoride, and 35 g. of tetrafluoroethylene. The polymerization mixture was heated at autogenous pressure at 55° C. to 99° C. for 2 hours. During this heating period, the reaction autogenous pressure fell from 3100 to 400 p.s.i.g.

The polymerization reaction product was a thick, white paste which weighed 397 g. From this product there was isolated by the usual procedure 126 g. of dry, white tetrapolymer.

Elemental analysis of the polymer product gave the following results: Carbon: 36.2%, 35.9%; hydrogen: 2.8%, 2.8%; fluorine: 56.7%, 57.0%.

The infrared spectrum showed $A_{5.7}$ to be 1.06 and also a band at 10.07 microns which is consistent with the presence of polymer units derived from perfluoropropyl perfluorovinyl ether. Based on these analyses, the polymer composition is 55.8% vinylidene fluoride, 17.2% tetrafluoroethylene, 15% perfluoropropyl perfluorovinyl ether and 12% vinyl butyrate.

Strong, tough, elastic fibers were drawn from the molten polymer. A coating of the polymer was melt-applied to bright aluminum at 300° C. This coating was adherent, clear, colorless and tough. A solution of the polymer in tetrahydrofuran was cast onto glass, and, after drying at room temperature, formed a clear, continuous, tough film. Tensile measurements on a melt-pressed film showed a yield point of 485 p.s.i., a tensile at failure of 1580 p.s.i., an elongation at failure of 825%, and an elastic modulus of $3.9 \times 10^3$ p.s.i.

Example 21.—Vinylidene fluoride/tetrafluoroethylene/ vinyl butyrate terpolymer

To a 420 ml. of stainless steel-lined pressure vessel which has been thoroughly purged with nitrogen were added 200 ml. of deoxygenated, deionized water, 0.5 g. of t-butyl hydroperoxide, 0.5 ml. of a 0.393% aqueous solution of cupric sulfate pentahydrate, 0.75 ml. of a 33% solution of the diethanolamine salts of mono- and bis[1H, 1H, 2H, 2H-perfluoroalkyl $(C_8-C_{16})$]phosphate in an equal weight mixture of water and isopropanol, and 5 g. of vinyl butyrate. Under an atmosphere of nitrogen, the pressure vessel was cooled in Dry Ice-acetone mixture to freeze the contents, a solution of 1.0 g. of ascorbic acid in 50 ml. of deoxygenated, deionized water was added, and the entire mixture was refrozen. The pressure vessel was closed and, while still at the Dry Ice-acetone temperature, was evacuated. Seventy grams of vinylidene fluoride and 10 g. of tetrafluoroethylene were charged by weight difference. The vessel and its contents were agitated and allowed to warm to room temperature. With continued agitation, the temperature of the polymerization mixture was raised 2° C. every two hours until at 36° C. the pressure began to decrease. Temperature was held at 36° C. to 39° C. for 8 hours during which period the pressure dropped from 775 to 475 p.s.i.g. The polymerization mixture was cooled to room temperature, the pressure vessel was vented, and the product mixture was discharged. The white polymer was a finely divided powder which was largely unwetted by the polymerization medium. It was separated by filtration, washed thoroughly with ethanol and dried to constant weight in a vacuum oven at 80° C. The yield was 50.3 g.

Elemental analysis of the polymer product gave the following results: Carbon: 35.9%, 36.2%; hydrogen: 2.7%, 2.8%; fluorine: 57.7%, 57.9%.

The infrared spectrum of the polymer showed $A_{5.7}$ to be 0.57 which corresponds to 6.4% by weight of the chain units being derived from vinyl butyrate. These results indicate that the terpolymer contains 79.5% by weight vinylidene fluoride units and 14.0% by weight units derived from tetrafluoroethylene.

The interpolymer was readily soluble in cyclohexanone. Films cast from a 10% solution of the interpolymer in cyclohexanone were very flexible and transparent. Attractive, clear coatings of the polymer were applied to redwood from the cyclohexanone solution.

Example 22.—Vinylidene fluoride/tetrafluoroethylene/ vinyl butyrate terpolymer

Using the general continuous polymerization procedure described in detail above, a terpolymer of vinylidene fluoride, tetrafluoroethylene, and vinyl butyrate was prepared in a stirred pressure reaction vessel having a capacity of 1.8 liters. The reactor was filled with dimethylsulfoxide, stirred at 1000 r.p.m. and heated to 65° C. The pressure release valve was set to maintain a pressure of 1500 p.s.i.g. The liquid feed solution consisting of a 75% solution of t-butyl peroxypivalate in mineral spirits as initiator, vinyl butyrate, and dimethylsulfoxide was pumped into the reactor such that the feed rates were 2.7 ml./hr. of initiator, 54.7 ml./hr. of vinyl butyrate, and 1950 ml./hr. of dimethylsulfoxide. At the same time a mixture of vinylidene fluoride and tetrafluoroethylene which has been passed through silica gel to remove polymerization inhibitors was compressed and pressure into the reaction vessel at a rate of 640 g./hr. of vinylidene fluoride and 160 g./hr. of tetrafluoroethylene. The temperature of 65° C. and pressure of 1500 p.s.i.g. were maintained. After 3 hours of operation, essentially steady state conditions were achieved, and the reaction was continued for an additional 9 hours. The reaction product was discharged from the reaction vessel as a clear, viscous liquid. The terpolymer was isolated by precipitation in a 2/1 by weight solution of ethanol/water and thorough washing with ethanol. Conversion of the reactants to terpolymer was 50%.

The isolated dried polymer was a soft, white solid which had an inherent viscosity as a 0.5% solution in dimethylformamide at 30° C. of 0.64. It was readily hot-pressed at 150° C. to soft, flexible, tough, somewhat elastic films. Tensile measurements on these films showed a yield point of 463 p.s.i., a tensile at break of 2400 p.s.i., an elongation of 750%, and a modulus of $4.6 \times 10^3$ p.s.i. Differential thermal analysis indicated a glass transition temperature of −18° C. and a crystalline melting point of 83° C. Polymer density was 1.70. Infrared spectrum analysis showed an absorbance at 5.7 microns of 0.85 and elemental analysis showed 57.2% fluorine, 36.4% carbon and 3.0% hydrogen. These analyses indicate a polymer composition of 68% units derived from vinylidene fluoride, 22% units from tetrafluoroethylene, and 10% units from vinyl butyrate.

A 40% by weight solution of the terpolymer in methyl ethyl ketone exhibited a solution viscosity at 25° C. of 44 stokes. Films were cast from cyclohexanone solutions. Fibers of the terpolymer were formed by injecting a methyl ethyl ketone solution of the polymer into a 3/1 ethanol/water solution. These fibers, after drying at 100° C. for 1 hour, were drawn 500% and the drawn fibers were quite elastic with rapid recovery. Fibers were also formed from the molten terpolymer at about 200° C.

A white paint was formulated from 25 g. of the polymer, 100 ml. of cyclohexanone, and 15 g. of pigment grade titanium dioxide and the mixture was milled for 7 days in a one-quart pebble mill. After separation from the pebbles, one coat of the paint was brush-applied to cedar and fir plywood panels. After air drying at room temperature until tack free, two additional coats of the paint were applied to each primed panel by spraying. For spraying, additional cyclohexanone was added to give a viscosity suitable for spray application. No change in appearance of the coatings were noted after 1300 hours exposure of the coated wood panels in the "Atlas Weather-Ometer." Coated wood panels exposed out of doors were noticeably cleaner after 3 months than similar panels coated with a commercial acrylic paint.

Example 23.—Vinylidene fluoride/tetrafluoroethylene/ vinyl butyrate terpolymer

Using the continuous polymerization procedure described in detail above, a terpolymer of vinylidene fluoride, tetrafluoroethylene, and vinyl butyrate was prepared in a stirred pressure reaction vessel having a capacity of 1.8 liters. The reactor was filled with 2,2,3,3-tetrafluoropropyl acetate, stirred at 800 r.p.m., and heated to 90° C. The pressure release valve was set to maintain a pressure of 800 p.s.i.g. The liquid feed solution containing lauroyl peroxide as initiator, vinyl butyrate, and 2,2,3,3-tetrafluoropropyl acetate was pumped into the reactor such that the feed rates were 305 ml./hr. of 2,2,3,3-tetrafluoropropyl acetate, 0.4 g./hr. of initiator, and 16 g./hr. of vinyl butyrate. At the same time, a mixture of vinylidene fluoride and tetrafluoroethylene which had been passed through silica gel to remove polymerization inhibitors was compressed and pressured into the reaction vessel at a rate of 240 g./hr. vinylidene fluoride and 60 g./hr. of tetrafluoroethylene. The temperature of 90° C. and pressure of 800 p.s.i.g. were maintained. The reaction product discharged from the reaction vessel as a clear, viscous liquid. The terpolymer was isolated. Conversion of the reactants to terpolymer was 49.5%. The isolated, dried polymer was a soft, white solid which has an inherent viscosity as a 0.5% solution by weight in dimethylformamide at 30° C. of 0.56. It was readily hot-pressed at 150° C. to soft, flexible, tough, somewhat elastic films. Tensile measurements on these films showed a yield point of 600 p.s.i., a tensile at break of 3000 p.s.i., and an elongation of 900%. Infrared spectrum analysis and elemental analysis indicated a polymer composition of 56.3% units derived from vinylidene fluoride, 33.1% units derived from tetrafluoroethylene, and 10.6% units derived from vinyl butyrate. The polymer was dissolved in a methyl ethyl ketone/cyclohexanone solvent and spray coated onto a redwood panel. No change in the appearance of the coating was noted after over 500 hours exposure in the "Atlas Weather-Ometer."

Example 24.—Vinylidene fluoride/tetrafluoroethylene/ vinyl acetate terpolymer

Using the general continuous polymerization procedure described in detail above, a terpolymer of vinylidene fluoride, tetrafluoroethylene, and vinyl acetate was prepared in a stirred pressure reaction vessel having a capacity of 1.8 liters. The reactor was filled with dimethylsulfoxide, stirred at 1000 r.p.m., and heated to 65° C. The pressure release valve was set to maintain a pressure of 1600 p.s.i.g. The liquid feed solution consisting of a 75% solution of tertiary-butyl peroxypivalate in mineral spirits as initiator, vinyl acetate, and dimethylsulfoxide was pumped into the reactor such that the feed rates were 2.7 ml./hr. of initiator, 1964 ml./hr. of dimethylsulfoxide, and 33.4 ml./hr. of vinyl acetate. At the same time, a mixture of vinylidene fluoride and tetrafluoroethylene which had been passed through silica gel to remove polymerization inhibitors was compressed and pressured into the reaction vessel at a rate of 640 g./hr. of vinylidene fluoride and 160 g./hr. of tetrafluoroethylene. The temperature of 65° C. and pressure of 1600 p.s.i.g. were maintained. The reaction product from the reaction vessel was a clear, viscous liquid. The terpolymer was isolated. Conversion of the reactants to terpolymer was 36%. The isolated, dried polymer was a soft, white solid which had an inherent viscosity as a 0.5% solution by weight in dimethylformamide at 30° C. of 0.65. It was readily hot-pressed at 150° C. to soft, flexible, tough, somewhat elastic films. Tensile measurements on these films showed a yield point of 550 p.s.i., a tensile at break of 2900 p.s.i., and an elongation of 750%. Infrared spectrum and elemental analyses indicated a polymer composition of 72.2% units derived from vinylidene fluoride, 22.2% units derived from tetrafluoroethylene, and 5.6% units derived from vinyl acetate. The fluffy, white solid polymer was soluble in ketonic solvents. The polymer melt extruded to clear, colorless, cold-drawable monofil.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An addition interpolymer comprising in copolymerized form
   (1) vinylidene fluoride,
   (2) from about 0.1 to about 0.4 mole of tetrafluoroethylene per mole of vinylidene fluoride, and
   (3) from about 0.05 to about 0.3 mole, per mole of vinylidene fluoride, of a vinyl ester of a $C_2$ to $C_{18}$ alkane carboxylic acid;
said interpolymer having an inherent viscosity of at least 0.30 as a 0.5% solution by weight in dimethylformamide at 30° C.

2. The interpolymer of claim 1 wherein the vinyl ester of the alkane carboxylic acid is vinyl butyrate.

3. The interpolymer of claim 1 wherein the inherent viscosity is from 0.4 to 1.0 as a 0.5% solution by weight in dimethylformamide at 30° C.

4. The interpolymer of claim 1 wherein an additional polymerizable monomer is present in an amount from 0.05 mole to about 0.4 mole, per mole of vinylidene fluoride, and is a polymerizable mono-unsaturated monomer selected from the group consisting of
   (A) a $C_3$ fluorocarbon olefin,
   (B) a $C_2$ to $C_3$ chlorofluorocarbon olefin,
   (C) a $C_2$ to $C_8$ hydrocarbon olefin, and
   (D) an alkyl vinyl ether wherein the alkyl group is 1 to 16 carbon atoms.

5. An interpolymer of claim 4 wherein the additional polymerizable monomer is a $C_3$ fluorocarbon olefin.

6. The interpolymer of claim 4 wherein the additional monomer is a $C_2$ to $C_3$ chlorofluorocarbon olefin.

7. The interpolymer of claim 4 wherein the additional monomer is a $C_2$ to $C_8$ hydrocarbon monoolefin.

8. The interpolymer of claim 4 wherein the additional monomer is an alkyl vinyl ether wherein the alkyl group is 1 to 16 carbon atoms.

9. The interpolymer of claim 4 wherein the additional monomer is hexafluoropropylene.

10. The interpolymer of claim 4 wherein the additional monomer is chlorotrifluoroethylene.

11. The interpolymer of claim 4 wherein the additional monomer is ethylene.

12. The interpolymer of claim 4 wherein the additional monomer is perfluoroalkyl perfluorovinyl ether.

13. An article of manufacture comprising a solid structural surface having thereon an adherent flexible film prepared from an interpolymer of claim 1.

14. An article of manufacture according to claim 13 wherein the solid structural surface is cellulosic.

15. An article of manufacture comprising a solid structural surface having thereon an adherent flexible film prepared from an interpolymer of claim 4.

16. An interpolymer of claim 1 wherein the interpolymer is pigmented.

17. An interpolymer of claim 4 wherein the interpolymer is pigmented.

18. An addition interpolymer comprising in copolymerized form
   (1) from 65% to 70% by weight of chain units derived from vinylidene fluoride,
   (2) from 18% to 27% by weight of chain units derived from tetrafluoroethylene, and
   (3) from 8% to 15% by weight of chain units derived from vinyl butyrate;
said interpolymer having an inherent viscosity of from 0.4 to 1.0 as a 0.5% solution by weight in dimethylformamide at 30° C.

19. An article of manufacture comprising the interpolymer of claim 1 in a structural form.

20. An article of manufacture comprising the interpolymer of claim 1 in the form of a fiber.

21. An article of manufacture comprising the interpolymer of claim 4 in the form of a fiber.

References Cited

UNITED STATES PATENTS

| | | | |
|---|---|---|---|
| 2,479,367 | 8/1949 | Joyce et al. | 260—87.5 |
| 3,193,539 | 7/1965 | Hauptshein | 260—87.7 |
| 3,318,854 | 5/1967 | Honn et al. | 260—87.7 |

JOSEPH L. SCHOFER, *Primary Examiner.*

STANFORD M. LEVIN, *Assistant Examiner.*

U.S. Cl. X.R.

117—123, 124, 127, 138.8, 143, 148, 152; 260—41, 80.77, 87.7